United States Patent
Hong et al.

(10) Patent No.: US 9,903,069 B2
(45) Date of Patent: Feb. 27, 2018

(54) COLORED COATINGS AND ARTIFICIAL LEATHERS

(71) Applicant: Milliken & Company, Spartanburg, SC (US)

(72) Inventors: Xiaoyong Michael Hong, Greer, SC (US); Chunping Xie, Shanghai (CN); Brian Sun, Shanghai (CN)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 14/683,157

(22) Filed: Apr. 10, 2015

(65) Prior Publication Data

US 2015/0299511 A1 Oct. 22, 2015

Related U.S. Application Data

(60) Provisional application No. 61/982,366, filed on Apr. 22, 2014.

(51) Int. Cl.
| | |
|---|---|
| *C09D 175/04* | (2006.01) |
| *C08K 5/00* | (2006.01) |
| *D06N 3/00* | (2006.01) |
| *C08K 5/3492* | (2006.01) |
| *D06N 3/14* | (2006.01) |

(52) U.S. Cl.
CPC ......... *D06N 3/0088* (2013.01); *C08K 5/3492* (2013.01); *C09D 175/04* (2013.01); *D06N 3/0065* (2013.01); *D06N 3/14* (2013.01)

(58) Field of Classification Search
CPC .... C09D 175/04; C08K 5/3492; D06N 33/14; D06N 33/0065; D06N 33/0088
USPC ........... 524/871; 156/247; 427/385.5
See application file for complete search history.

(56) References Cited

U.S. PATENT DOCUMENTS

| | | | |
|---|---|---|---|
| 3,607,358 A | 9/1971 | Dangl et al. | 117/63 |
| 3,879,336 A | 4/1975 | Maeda et al. | 260/37 |
| 3,880,797 A | 4/1975 | Maeda et al. | 260/37 |
| 3,901,648 A | 8/1975 | Arbaud | 8/4 |
| 4,284,729 A * | 8/1981 | Cross | C08G 18/38 521/158 |
| 4,367,307 A | 1/1983 | Hirai et al. | 524/590 |
| 4,756,947 A | 7/1988 | Nishikawa et al. | 428/151 |
| 5,053,464 A | 10/1991 | Shirai et al. | 525/454 |
| 5,766,268 A * | 6/1998 | Bruhnke | C09B 69/10 106/493 |
| 5,876,466 A | 3/1999 | Nakashima et al. | 8/442 |
| 6,306,459 B1 | 10/2001 | Fleming | 427/163.4 |
| 6,361,850 B1 | 3/2002 | Billingsley et al. | 428/143 |
| 6,479,561 B1 | 11/2002 | Zhou et al. | 521/155 |
| 6,586,051 B2 | 7/2003 | Zhou et al. | 427/372.2 |
| 7,662,461 B2 | 2/2010 | Xia et al. | 428/160 |
| 7,824,737 B2 | 11/2010 | Xia et al. | 427/372.2 |
| 7,872,069 B2 | 1/2011 | Xia et al. | 524/591 |
| 2005/0124727 A1* | 6/2005 | Huber | C09B 67/0085 523/160 |
| 2008/0169058 A1 | 7/2008 | Feng et al. | 156/246 |
| 2015/0299942 A1 | 10/2015 | Hong et al. | |

FOREIGN PATENT DOCUMENTS

| | | |
|---|---|---|
| CN | 101748622 | 6/2010 |
| CN | 102746714 | 10/2012 |
| KR | 10-2013-0059568 | 6/2013 |
| WO | WO 2012/126665 | 9/2012 |

* cited by examiner

*Primary Examiner* — Kelechi Egwim
(74) *Attorney, Agent, or Firm* — Brenda D. Wentz

(57) ABSTRACT

Novel coated substrates comprise a substrate and a coating thereon. The coating comprises a polymeric component and a colored oligomer. The colored oligomer is produced from a reactive dye with nucleophilic compounds, and optionally further complexed with organic cationic compounds.

6 Claims, No Drawings

COLORED COATINGS AND ARTIFICIAL LEATHERS

CROSS REFERENCE TO RELATED APPLICATIONS

This application claims priority to U.S. Patent Application Ser. No. 61/982,366, entitled "Colored Coatings and Artificial Leathers," which was filed on Apr. 22, 2014, and which is entirely incorporated by reference herein.

FIELD OF THE INVENTION

The present invention relates to substrates comprising a coating on the surface thereof, such as substrates having a coating thereon intended to mimic the look and feel of leather.

BACKGROUND OF THE INVENTION

Synthetic leather typically is produced by coating or laminating an elastic polymer resin, such as a polyurethane resin, a polyvinyl chloride resin, or a blend of such resins, onto the surface of a fibrous base material. In order to produce a synthetic leather in a variety of colors and/or shades, various pigments or dyes have been used to color the resin applied to the surface of the base material. However, the use of such pigments and dyes has not been without its disadvantages and drawbacks.

For example, pigments usually have low tinting strength and a dull shade, which can limit the aesthetic qualities of synthetic leather produced therefrom. Pigments typically lack solubilizing groups, which frequently allows the pigment particles to aggregate and form larger secondary and tertiary aggregate particles during production processes. Owing to these difficulties, synthetic leathers colored with conventional pigments often exhibit poor color retention, have a dark or dull shade, or contain unsuitable variations in color depth. While these problems can be partially addressed through the addition of dispersing agents or by utilizing pigment dispersions, these measures often result in increased production costs and require great care to minimize color variations produced by settling of the pigment(s) and/or incompatibility of these components with the resin.

Dyes, on the other hand, typically contain solubilizing groups that can facilitate dispersion of the dye in a suitable medium. Dyes also typically exhibit relatively high tinting strength, good transparency, good thermal stability, and acceptable resin compatibility. Nevertheless, dyes typically exhibit poor weather durability, poor water resistance, poor oil resistance, and often migrate or bleed through to the transfer substrates, such as a release paper, used to produce the synthetic leather, and to other substrates in contact with the synthetic leather surface. In order to address the migration of dyes to the transfer substrate, attempts have been made to utilize nylon or polyurethane overcoats applied to the transfer substrate. However, satisfactory topcoats have not been developed without incurring significantly higher cost.

U.S. Pat. No. 7,662,461 to Xia and U.S. Pat. No. 7,824,737 to Xia disclose synthetic leather articles comprising a polyurethane coating made from polymeric colorants and/or polyurethane colorants made from polymeric colorants with reactive functional groups. Such polyurethane polymeric colorants give great transparency, compatibility and vivid colors. But these polyurethane colorants do not have good migration properties as pigments, or as good as desired.

A need therefore remains for novel colored synthetic leather articles that address the deficiencies of articles produced with conventional pigments, dyes and/or polymeric colorants, while still exhibiting the desired aesthetic qualities. The present invention provides such articles and methods for producing the same. This invention intends to provide colored polyurethane synthetic leathers which are transparent, compatible with the polyurethane resins, and do not have migration issues to release papers and/or other contacting substrates and surfaces.

BRIEF SUMMARY OF THE INVENTION

The present invention relates to a synthetic leather article comprising a substrate and a coating on at least one surface of the substrate. The coating comprises at least one resin and a colorant. The colorant comprises a chromophore and an oligomeric constituent bound to the chromophore. The colorant is made from a reactive dye and a compound with at least one functional group which may be covalently linked to the reactive dye molecule. The functional groups of the compound include amine, hydroxyl group, thiol or other nucleophilic groups. The preferred colorant is a polymeric colorant, wherein a polymeric compound is covalently linked to a reactive dye chromophore through a nucleophilic group. Optionally, the colorant made from a reactive dye and a nucleophile is further complexed with a cationic compound to form a colorant complex.

The present invention also relates to a coating comprising at least one resin and at least one reactive dye derivative, wherein the reactive dye derivative contains at least one nucleophilic group of general structure (I):

$$X-Y-Z \qquad (I)$$

wherein X is a nucleophilic reactive linking group; Y is an aliphatic or aromatic or polymeric organic substituent; and Z is an end group;

wherein X is selected from the group consisting of NR, O, S, and 4-oxyanilino (—HN-Ph-O—); R is selected from the group consisting of H, alkyl, and YZ; and wherein Y is a monomeric or polymeric aliphatic or aromatic group or combinations thereof. The reactive dye derivative may be further complexed with a cationic compound.

The present invention also relates to a method for producing a synthetic leather article comprising the steps of (a) providing a resin or prepolymer, (b) providing a colorant, (c) mixing the colorant and the resin or prepolymer to form a mixture, (d) applying the mixture obtained in step (c) onto a transfer substrate and heating the substrate to dry the substrate and form a resin coating thereon, (e) applying an adhesive onto the resin coating produced in step (d), (f) applying a backing substrate to the adhesive layer produced in step (e), (g) heating the assembly produced in step (f) to dry the assembly and bond the backing substrate to the adhesive layer, and (h) removing the transfer substrate from the assembly produced in (g) to produce a synthetic leather article.

The invention also relates to a method for producing a synthetic leather article comprising the steps of (a) providing a resin or prepolymer, (b) providing a colorant, (c) mixing the colorant and the resin or prepolymer to form a mixture, (d) applying the mixture obtained in step (c) onto a backing substrate, (e) immersing the coated substrate obtained in step (d) in an aqueous solution or exposing the coated substrate to moisture to cure the resin or prepolymer and form a coating on the surface thereof, (f) removing the substrate from the aqueous solution, and (g) heating the substrate to dry the substrate and produce a synthetic leather article.

DETAILED DESCRIPTION OF THE INVENTION

This invention is related to colored synthetic leather articles. The synthetic leather articles have excellent color non-migration properties. The colors are bright, non-staining to release paper (e.g. transfer substrate), have good solvent (MEK) wicking properties, and improved lightfastness. The colorants utilized herein are made from selective reactive dyes that are reacted with amine or hydroxyl-containing compounds, and optionally, may be further complexed with cationic compounds, such as quaternary ammonium or phosphonium compounds. The preferred colorants are polymeric colorants made from reactive dyes that are reacted with a polymeric nucleophile.

The synthetic leather article comprises a substrate and a coating on at least one surface of the substrate. The coating comprises a resin and a colorant. The colorant can be dispersed or dissolved within the resin to produce a colored resin.

The substrate can be any suitable substrate, such as a fibrous substrate. In certain possibly preferred embodiments, the substrate is a textile material. Suitable textiles include, but are not limited to, woven textiles, knit textiles, and non-wovens. The textiles can be made from any suitable natural fibers, synthetic fibers, or combinations thereof.

In order to promote adhesion between the substrate and the coating, the substrate can comprise a precoat layer on the surface to which the coating is applied. The precoat layer can comprise any suitable material, such as a material that promotes adhesion between the substrate and the coating. For example, the precoat layer can comprise elastomeric polymers.

Resins/Prepolymers

The resin or prepolymer in the coating can be any suitable resin or prepolymer. The resin typically will be selected to provide an article that is flexible and durable, while providing the properties necessary or desirable for mimicking real leather. In one aspect, the resin is selected from the group consisting of polyurethane resins, polyurea resins, and combinations thereof. Suitable polyurethane resins include linear polyurethanes as well as cross-linked polyurethanes, such as polyurethane cross-linked with hexamethylene diisocyanate trimer. Suitable polyurethane resins include both organic solvent based and water based solutions and/or dispersions.

The resins suitable for use in the coating can be produced using any suitable polyol. Suitable polyols include, but are not limited to, glycols of low molecular weight, such as ethylene glycol, 1,2-propylene glycol, 1,3-propylene glycol, 1,4-butylene glycol, and 1,6-hexamethylene glycol; polyester diols obtained from dibasic acids, such as adipic acid, maleic acid, and terephthalic acid; polyester diols, such as polylactones obtained by subjecting lactones to ring-opening polymerization with glycols; polycarbonate diols; and polyether diols, such as polytetramethylene glycol, polyethylene glycol, and polypropylene glycol.

The resins suitable for use in the coating can be produced using any suitable isocyanate. Suitable isocyanates include, but are not limited to, aromatic diisocyanates, such as toluene-2,4-diisocyanate (TDI), 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanatodiphenyl ether, 4,4'-methylenebis(phenyl-isocyanate) (MDI), polymeric MDI, durylene diisocyanate, tolidine diisocyanate, xylylene diisocyanate (XDI), 1,5-naphthalene diisocyanate, benzidine diisocyanate, o-nitrobenzidine diisocyanate, and 4,4-diisocyanatodibenzyl; aliphatic diisocyanates, such as methylene diisocyanate, 1,4-tetramethylene diisocyanate, 1,6-hexamethylene diisocyanate, and 1,10-decamethylene diisocyanate; alicyclic diisocyanates, such as 1,4-cyclohexylene diisocyanate, 4,4-methylene-bis(cyclohexylisocyanate), 1,5-tetrahydronaphthalene diisocyanate, isophorone diisocyanate, hydrogenated MDI, and hydrogenated XDI; and polyurethane prepolymers obtained by reacting any of the aforementioned diisocyanates with polyols or polyamines of low molecular weights such that the resulting prepolymers have isocyanate groups at ends thereof. Among the aforementioned, aromatic diisocyanates, particularly diphenylmethane-4,4'-diisocyante (4,4'-MDI) or polymeric MDI, are preferred for obtaining articles exhibiting good physical characteristics such as thermal stability, solution stability, and fracture strength. Alicyclic diisocyanates, such as isophorones, are preferred for obtaining polyurethanes that exhibit non-yellowing properties and are not easily discolored upon exposure to sunlight.

The resins or prepolymers suitable for use in the coating can be produced using suitable chain extenders. These include, but are not limited to, water; low-molecular diols, such as ethylene glycol, 1,4-butanediol, 1,6-hexanediol and propylene glycol; aliphatic diamines, such as ethylenediamine; aromatic diamines, such as 4,4'-diaminodiphenylmethane; alicyclic diamines, such as 4,4'-diaminodicyclohexylmethane and isophoronediamine; alkanolamines, such as ethanolamine; hydrazines; and dihydrazides, such as succinic dihydrazide. Among the aforementioned chain extenders, the diamine compounds are preferable, with 4,4'-diaminodiphenylmethane being particularly preferred due to its heat resistance and 4,4'-diaminodicyclohexylmethane being preferred for light resistance. The aforementioned chain extenders can, of course, be used alone or in any suitable combination.

Other resins or polymers can be used in combinations with the aforementioned resins. Thus, in certain embodiments, the coating can comprise one or more polymers or resins selected from the group consisting of polyvinyl chloride (PVC), polyvinylidene chloride, polyvinyl acetate, polyacrylic acid, alkylpolyacrylate, polymethacrylic acid, alkylpolymethacrylate, and copolymers thereof.

Colorants

The colorant in the coating can be any suitable colorant. The colorant may preferably be a polymeric colorant. As utilized herein, the term "polymeric colorant" is used to refer to a colorant comprising a chromophore and an oligomeric constituent bound to the chromophore. In one aspect, the polymeric colorant contains at least two repeat units in the molecular structure and the molecular weight of the molecule is at least 300.

The oligomeric constituent can be bound to the chromophore via any suitable means, such as a covalent bond, an ionic bond, or suitable electrostatic interaction. The oligomeric constituent can have any suitable formula weight. As utilized herein in reference to the oligomeric constituent, the term "formula weight" refers to the weight (in grams) of the oligomeric constituent per mole of the polymeric colorant. In other words, the "formula weight" of the oligomeric constituent refers to the portion of the polymeric colorant's molecular weight attributable to the oligomeric constituent (the remainder being attributable to the chromophore and any groups attached thereto). Typically, the oligomeric constituent has a formula weight of about 40 or more. The oligomeric constituent typically has a formula weight of about 5,000 or less. In certain possibly preferred embodiments, the oligomeric constituent has a formula weight of about 40 to about 5,000.

The reactive dye mentioned here is a conventional fiber reactive dye as defined by dyeing industries with a chromophore and at least one substituent that can react with the substrates, such as cellulose (cotton, linen, rayon, bamboo, hemp, jute, flax etc.), wool, nylon, and silk. Common reactive dyes also contain water solubilizing groups like sulfonate or others.

Suitable colorants for this invention includes a colorant compound as defined by Formula (I):

$$A\text{-}(B\text{—}X\text{—}Y\text{—}Z)_n \qquad (I)$$

wherein A-B is a reactive dye, wherein A is an organic chromophore, B is an electrophilic reactive group covalently bonded to A directly or through a linking group, and X is a nucleophilic linking group covalently bond to Y and reactive to B, and Y is aliphatic or aromatic substituent, and Z is an end group of organic substituent Y, and n is an integer from 1 to 10.

Optionally, the colorants for the inventive coating includes a colorant complex having a Formula (II):

$$[A\text{-}(B\text{—}X\text{—}Y\text{—}Z)_n]Q_m \qquad (II)$$

wherein A, B, X, Y, Z and n are the same as defined in Formula (I), Q is a cationic organic counter ion, and m is an integer from 1 to 20.

Reactive Dyes A-$B_n$

A broad range of reactive dyes has been synthesized and made commercially available. The general structure of a reactive dye can be represented by A-$B_n$, wherein A is an organic chromophore, B is an electrophilic reactive group covalently bonded to A directly or through a linking group and n is an integer, which is the number of reactive group, B, on one organic chromophore, A. The group A is a chromophore, usually a conjugated aromatic organic structure, such as azo groups, like monoazo, bisazo, and polyazo including their complexes with Cr, Fe, Co, and Cu; phthalocyanine; anthraquinone; aza[8]annulene, annulene; formazan copper complex; triphenodioxazine; nitroso; nitro; diarylmethane; triarylmethane; xanthene; acridene; methine; thiazole; indamine; azine; oxazine; thiazine; quinoline; indigoid; indophenol; lactone; aminoketone; hydroxyketone; and stilbene chromophores. Preferably, the reactive dye incorporates an azo, phthalocyanine or anthraquinone chromophore group. The group B is an electrophilic functional group such as monohalotriazole, dihalotriazole, monohalopyrimidine, dihalopyrimidine, trihalopyrimidine, dihaloquinoxaline, dihalopyrazone, dihalophthalazine, halobenzothiazole, mono-(rn-carboxypyridinium)-triazine, amino epoxide, methylamino, sulfatoethyl sulfone, sulfatoethyl sulfonamide, chloroethyl sulfone, vinyl sulfone, phenylamino sulfone, acrylamide, alpha-haloacryloylamide, alpha, beta-dihalopropionyl amide, halosulfonyl pyrimidine, sulfatoethylamino sulfone, sulfatopropionamide, halosulfatothiazinylamide, and haloacetylamide.

The n is an integer from 1 to 10 and represents the number of reactive groups on one chromophore. Preferably, n is 1 to 5, and more preferably n is 2 to 4. It is possible that there are more than one reactive group, B, on one chromophore, and the reactive groups can be the same or different. For simplicity, a B is used to represent all reactive groups, no matter whether they are the same or different. Preferably, A is azo, phthalocyanine, or anthraquinone and B is monochlorotriazine, monofluorotriazine, dichlorotriazine, sulfatoethyl sulfone, vinyl sulfone, 2,3-dichloroquinoxaline, or 2,4-difluor-5-chloropyrimidine.

The examples of the reactive dyes formed by the combination of A and B (A-B as noted above) can be C.I. Reactive Black 5, C.I. Reactive Blue 2, C.I. Reactive Blue 4, C.I. Reactive Blue 7, C.I. Reactive Blue 9, C.I. Reactive Blue 15, C.I. Reactive Blue 19, C.I. Reactive Blue 27, C.I. Reactive Violet 3, C.I. Reactive Violet 5, C.I. Reactive Red 2, C.I. Reactive Red 24, C.I. Reactive Orange 4, C.I. Reactive Orange 13, C.I. Reactive Orange 16, C.I. Reactive Orange 78, C.I. Reactive Yellow 3, C.I. Reactive Yellow 13, C.I. Reactive Yellow 14, C.I. Reactive Yellow 17, or C.I. Reactive Yellow 95.

Nucleophile X—Y—Z

According to this invention, the nucleophiles which can be covalently connected to a reactive dye have the general structure of:

$$X\text{—}Y\text{—}Z \qquad (III)$$

wherein X is a nucleophilic reactive linking group; Y is an organic substituent, either aliphatic or aromatic, or polymeric; and Z is an end group.

The nucleophilic linking group, X, is selected from the group consisting of NR, O, S, and 4-oxyanilino (—HN-Ph-O—); wherein R is selected from the group consisting of H, alkyl, and YZ. Two YZ substituents may be bonded to reactive dye AB through a linking group comprising a trivalent atom, e.g., N.

The organic substituent, Y, can be any monomeric or polymeric aliphatic or aromatic group, or combination thereof. Y can be a simple hydrocarbon chain, or ether, ester, amide, sulfur or phosphorus carbon chain. Y can be a poly(oxyalkylene)-containing moiety comprising the formula $(C_aH_{2a}O)_m(C_bH_{2b}O)_n$ wherein a and b are different and from 1 to 8, preferably from 1 to 4, e.g., a is 2, b is 3, m is at least 3, preferably at least 11, e.g., wherein lower staining factor of the resulting colorant composition is desired; n is an integer from 0 to 15 inclusive, e.g., 0 or 1. The molecular weight of the Y moiety can be less than 8000 and can range from 130 to 5000, preferably from 480 to 4000.

Typical of such Y substituents are poly(oxyalkylene) polymers and copolymers. In this regard, polyalkylene oxides and copolymers of same which may be employed to provide the colorant of the present invention are, without limitation, polyethylene oxides, polypropylene oxides, polybutylene oxides, copolymers of polyethylene oxides, polypropylene oxides and polybutylene oxides, and other copolymers including block copolymers, in which a majority of the polymeric substituent is polyethylene oxide, polypropylene oxide and/or polybutylene oxide. While such substituents generally have an average molecular weight in the range of from 130 to 8000, or in the range from 130 to 3000, they should not be so limited.

In a particular embodiment of the present invention, Y can be described as a polysiloxane-poly(oxyalkylene) copolymer which incorporates:

(a) a polysiloxane segment characterized by a —Si($R^1$)($R^2$)O— repeating group wherein $R^1$ and $R^2$ are each selected from the group consisting of alkyl, phenyl, vinyl, 3,3,3-trifluoropropyl, and hydrogen (preferably $R^1$ and $R^2$ are alkyl, with methyl especially preferred); and (b) a polyether segment characterized by a poly(oxyalkylene) group which may be i) in the copolymer backbone or ii) pendent from a siloxane or silane repeating group.

Y copolymers having pendent poly(oxyalkylene) groups along a polysiloxane backbone may be synthesized by incorporating siloxane groups with reactive functionalities into the backbone of the polymer. The siloxane groups may be alkoxylated, esterified or otherwise provided with a poly(oxyalkylene) functionality. Copolymers having a polysiloxane backbone and pendent poly(oxyalkylene) groups are commercially available in the Masil Silicone Surfactants product line, available from PPG Industries, Inc., Gurnee, Ill., USA. Polysiloxane-polyether copolymers are disclosed in the following patents: U.S. Pat. No. 5,271,868 to Azechi et al.; U.S. Pat. No. 5,300,667 to Kasprzak et al.; and U.S. Pat. No. 5,376,301 to Fleuren et al. Another method of synthesizing polysiloxane-polyether copolymers is disclosed by Jainlong Ni et al. "Synthesis of a Novel Polysiloxane-based Polymer Electrolyte and its Ionic Conductivity," Polymers for Advanced Technologies Vol. 4, pp. 80-84 (1993). Allyl polyethers are grafted onto polysiloxane to form the copolymer. Sela et al., "Newly Designed Polysiloxane-graft-poly(oxyethylene) Copolymeric Surfactants," Colloid PolymSci 272:684-691 (1994) disclose comb grafted surfactants based on a poly(methylhydrogen siloxane)/poly(dimethylsiloxane) block copolymer backbone which is sililated with a vinyl terminated poly(oxyethylene) group. Alternatively, the polysiloxane-poly(oxyalkylene) copolymer is a block copolymer incorporating a poly(oxyalkylene) substituted silane, e.g., copolymer incorporating silane a group having the structure —Si($R^3$-poly(oxyalkylene))($R^4$)—, where $R^3$ is an alkylene group, preferably methylene or ethylene, and $R^4$ is H, alkyl, or phenyl, preferably methyl. Such copolymers are commercially available, for example, the dimethylsiloxane-alkylene oxide copolymers available from Petrarch Systems, Silanes and Silicones Group, Bristol, Pa., USA.

Block copolymers having a poly(oxyalkylene) segment in the backbone may be synthesized by procedures well known in the art, and are commercially available from Dow Corning, Midland, Mich., USA under the 5103 Fluid and Q2-5211 wetting agent product lines.

Y can also be described as a poly(oxyalkylene)-containing polysiloxane moiety selected from the group consisting of $(OSi(R')(R''))_iO(SiR'R'''O(C_aH_{2a}O)_m(C_bH_{2b}O)_n)_j$ and $(OSi(R')(R''))_i(R'''O(C_aH_{2a}O)_m(C_bH_{2b}O)_n)_j$ wherein R' and R'' are each alkyl, preferably $C_1$ to $C_4$ alkyl, more preferably, methyl; R''' is alkylene, preferably $C_1$ to $C_3$ alkylene, more preferably ethylene; i and j are integers selected to provide a molecular weight for Y of 300 to 10000, preferably 450 to 5000, more preferably 800 to 1400; i is at least 3; j is at least 1; a and b are different and from 1 to 8, preferably from 1 to 4, more preferably from 2 to 3; m is at least 3, preferably 5 to 15; and n is from 0 to 15, preferably 0.

Further description of the polysiloxane poly(oxyalkylene) copolymers useful in the present invention may be found in the Encyclopedia of Polymer Science and Engineering, John Wiley & Sons, Vol. 15, pages 234-244 (1989) and the references cited therein.

The end group Z of the nucleophilic substituent XYZ is not believed to be critical insofar as the functioning of the colorant is concerned. The end group Z can be any suitable terminal group, e.g., one selected from the group consisting of hydroxyl, alkyl, e.g., $C_1$ to $C_4$ alkyl, amino, amido, alkyl ester, e.g., acetyl, phenyl ester, alkyl ether, alkyl acetal, and BA wherein Y has a nucleophilic end group (such as wherein the polysiloxane-poly(oxyalkylene) copolymer is a diamine). The end group can itself contribute to solubility characteristics of the colorant product. Examples of other suitable terminal groups are those disclosed in U.S. Pat. No. 5,270,363 to Kluger et al. for poly(oxyalkylene) polymers. In instances where Z is XBA, the resulting colorant has the structure ABXYXBA wherein X, B, and A are as described above.

Optionally, the colored compound according to Formula (I) can be further complexed with a cationic compound, Q. A cationic group may comprise an amino, ammonium, imino, sulfonium or phosphonium group.

A wide range of quaternary ammonium compounds, including quaternary ammonium salts, pyridium salts, piperidinium salts, and the like, have been shown to be useful for practicing the invention. A list of potentially useful quats within this invention includes trialkyl, dialkyl, dialkoxy alkyl, monoalkoxy, benzyl, and imidazolinium quaternary ammonium compounds. Various types of quaternary ammonium compounds can be adapted to the invention herein with success. The quaternary ammonium compounds are analogs of ammonium salts in which organic radicals have been substituted for all four hydrogens of the original ammonium cation. Substituents maybe alkyl, aryl, aralkyl, or alkoxylates, or the nitrogen may be part of a ring system. By way of example, and not limitation, a list of preferred classes and examples of quaternary ammonium compounds is set forth in TABLE 1 below:

TABLE 1

| Class | Example |
| --- | --- |
| Trialkyl quats | Methyl tri(hydrogenated tallow) ammonium chloride |
| Dialkyl quats | Dicoco dimethyl ammonium chloride |
| Dialkoxy alkyl quats | Methyl bis(polyethoxyethanol) coco ammonium chloride |
| Monoalkoxy quats | Methyl (polypropylene glycol) diethyl ammonium chloride |
| Benzyl quats | Dimethyl tallow benzyl ammonium chloride |
| imidazolinium quats | Methyl tallow amido-2-tallow imidazolinium methylsulfate |

Other nitrogen based cationic compounds include 4-(dimethylamino)pyridinium tribromide, dodecylethyldimethylammonium bromide, 1-dodecylpyridinium chloride hydrate, dodecyltrimethylammonium bromide, 1-ethyl-3-methyl-1H-imidazolium chloride, 1-ethyl-4-(methoxycarbonyl) pyridinium iodide, 6-hydroxy-2,4,5-triaminopyrimidine sulfate, 2-hydroxy-4-methylpyrimidine hydrochloride, stearyl trimethylammonium chloride, p-xylylene-bis(tetrahydrothiophenium chloride), trimethyl sulfonium iodide, diphenyl iodonium chloride, ferrocenium hexafluorophosphate, dodecyldimethyl(3-sulfopropyl)ammonium hydroxide, 1-(N,N-dimethylcarbamoyl)-4(2-sulfo-ethyl)pyridinium hydroxide, and 2-ethyl-5-phenylisoxazolium-3'-sulfonate, cationic quaternary ammonium fluoroalkyl surfactant, such as FLUORAD FC-135 surfactant (manufactured by 3M Co. of St. Paul, Minn.), SURFLON S-121 surfactant (manufactured by Seimi Chemical Co., Japan), or Neos FTERGENT 300 surfactant (manufactured by Neos, Japan).

Other conventional cationic species including carbonium salts, iodonium salts, sulfonium salts, pyrrilium salts, phosphonium salts, etc. can also be used for this invention. Some of these cationic compounds can increase the water resistance of the colorant complexes. Phosphonium salts are selected from the group consisting of allyl triphenyl phosphonium bromide, allyl triphenyl phosphonium chloride, vinyl triphenyl phosphonium bromide, (3-bromobutyl)triphenyl phosphonium bromide, (4-bromobutyl)triphenyl phosphonium bromide, (bromodifluoromethyl)triphenylphosphonium bromide, chloroethylene triphenyl phosphonium bromide, 1,1,1-trifluoroacetonyl triphenyl phosphonium bromide, methyl triphenyl phosphonium bromide, ethyl triphenyl phosphonium bromide, propyl triphenyl phosphonium bromide, n-butyl triphenyl phosphonium bromide, isopropyl triphenyl phosphonium bromide, n-pentyl triphenyl phosphonium bromide, acetonyl triphenyl phosphonium bromide, 4-carboxybutyl triphenyl phosphonium bromide, (ethoxycarbonylmethyl)triphenyl phosphonium bromide, (methoxymethyl)triphenyl phosphonium bromide, triphenyl phosphonium hydrobromide, (2-hydroxyethyl)triphenyl phosphonium chloride, (2-hydroxyethyl)triphenyl phosphonium bromide, [3-hydroxy-2-methylpropyl]triphenyl phosphonium bromide, [2-(trimethylsilyl)ethoxymethyl]triphenyl phosphonium chloride, methyltriphenoxy phosphonium iodide, [3-(dimethylamino)propyl]triphenyl phosphonium bromide, and dim ethylaminoethyl triphenyl phosphonium bromide. Other phosphonium: a phosphonium salt selected from the group consisting of (ethoxycarbonylmethyl)triphenyl phosphonium bromide, (ethoxycarbonylmethyl)triphenyl phosphonium chloride, (methoxymethyl) triphenyl phosphonium bromide, triphenyl phosphonium hydrobromide, (2-hydroxyethyl)triphenyl phosphonium chloride, (2-hydroxyethyl)triphenyl phosphonium bromide, [3-hydroxy-2-methylpropyl]triphenyl phosphonium bromide, [2-(trimethylsilyl)ethoxymethyl]triphenyl phosphonium chloride, methyltriphenoxy phosphonium iodide, [3-(dimethylamino)propyl]triphenyl phosphonium bromide, acetonyl triphenyl phosphonium bromide, tetrakis(hydroxymethyl)phosphonium chloride, 2-acetonapthonyl triphenyl phosphonium bromide, 2',5'-dimethoxyphenacyltriphenyl phosphonium bromide, 1-hydroxydodecyl triphenyl phosphonium bromide, 2-ethylindolinyl triphenyl phosphonium bromide, 3'-methoxyphenacyl triphenyl phosphonium bromide, 3-methylpyrridinyl triphenyl phosphonium bromide, phenacyl dimethylaminophenyl diphenyl phosphonium chloride, methyl(dimethylaminophenyl diphenyl) phosphonium bromide, [3-(ethoxycarbonyl)-2-oxypropyl] triphenyl phosphonium chloride, (2-hydroxybenzyl) triphenyl phosphonium bromide, benzotriazol-1-yloxytripyrrolidino-phosphonium hexafluorophosphate, triphenyl(2-pyridylmethyl)phosphonium chloride hydrochloride, (4-ethoxybenzyl)triphenyl phosphonium bromide, (3-benzyloxypropyl)triphenyl phosphonium bromide, phenacyl triphenyl phosphonium chloride, benzotriazol-1-yloxytris(dimethylamino)phosphonium hexafluorophosphate, and 2-acetonapthonyl triphenyl phosphonium bromide.

A cationic compound can be selected from suitable ionic liquid, comprising an organic cation and an inorganic or organic anion. Examples are N-ethyl-N'-methylimidazolium (EMIM), N-methylimidazolium (MEHIM), N-butyl-N'-methylimidazolium (BMIM), N-ethyl-N'-ethylimidazolium (EEIM), N-n-propyl-N'—N-propylimidazolium (PPIM), and other Basionics™ ionic liquid products from BASF.

The cationic compound, Q, can be a cationic polymer. Cationic polymers are suitable for the purposes of the present invention regardless of the number, type or concentration of the monomers used to make them and they can be in the form of a liquid or dried to a powder. Examples of such polymers are those marketed by Degussa under trade names Praestaret K-325 and Praestaret K-350 as well as Praestol E-125 and Praestor E-150.

The cationic polymers will have cationic nitrogen-containing moieties such as quaternary ammonium or cationic amino moieties, or a mixture thereof. Any anionic counterions can be utilized for the cationic polymers so long as the water solubility criteria are met. Suitable counterions include halides (e.g., Cl, Br, I, or F, preferably Cl, Br, or I), sulfate, and methylsulfate. Others can also be used, as this list is not exclusive.

The cationic nitrogen-containing moiety will be present generally as a substituent, on a fraction of the total monomer units of the cationic polymers. Thus, the cationic polymer can comprise copolymers, terpolymers, etc. of quaternary ammonium or cationic amine-substituted monomer units and other non-cationic units referred to herein as spacer monomer units. Such polymers are known in the art, and a variety can be found in the CTFA Cosmetic Ingredient Dictionary, 3rd edition, edited by Estrin, Crosley, and Haynes, (The Cosmetic, Toiletry, and Fragrance Association, Inc., Washington, D.C., 1982).

Suitable cationic polymers include, for example, copolymers of vinyl monomers having cationic amine or quaternary ammonium functionalities with water soluble spacer monomers such as acrylamide, methacrylamide, alkyl and dialkyl acrylamides, alkyl and dialkyl methacrylamides, alkyl acrylate, alkyl methacrylate, vinyl caprolactone, and vinyl pyrrolidone. The alkyl and dialkyl substituted monomers preferably have $C_1$-$C_7$ alkyl groups, more preferably $C_1$-$C_3$ alkyl groups. Other suitable spacer monomers include vinyl esters, vinyl alcohol (made by hydrolysis of polyvinyl acetate), maleic anhydride, propylene glycol, and ethylene glycol.

The cationic amines can be primary, secondary, or tertiary amines, depending upon the particular species and the pH of the mixture. In general, secondary and tertiary amines, especially tertiary amines, are preferred.

Amine-substituted vinyl monomers can be polymerized in the amine form, and then optionally can be converted to ammonium by a quaternization reaction. Amines can also be similarly quaternized subsequent to formation of the polymer. For example, tertiary amine functionalities can be quaternized by reaction with a salt of the formula R'X wherein R' is a short chain alkyl, preferably a $C_1$-$C_7$ alkyl, more preferably a $C_1$-$C_3$ alkyl, and X is an anion which forms a water soluble salt with the quaternized ammonium.

Colorant Preparation

The colorant compositions used in the present invention can be readily prepared by covalently bonding reactive dye AB (as listed above) to the nucleophile XYZ group by heating an aqueous mixture of the nucleophilic compound and the dye to a temperature in the range from 40° C. to 100° C., preferably in the range from 60° C. to 100° C. For example, at 85° C., the reaction will be complete in two hours. The pH of the reaction composition is maintained to avoid protonating amine if present in the reaction mixture. A molar excess of the nucleophilic group XYZ is typically employed to insure complete conversion and to minimize the presence of unreacted and unsubstituted reactive dye, which can cause undesirable by-products. Acid scavengers, such as sodium carbonate and/or sodium bicarbonate, are preferably present in the reaction mixture, for example, in about equivalent amounts. The nucleophile-substituted colorant of the present invention formed in the reaction composition may be concentrated or diluted as desired for a particular application by evaporation or the addition of water, respectively.

Optionally, the nucleophile substituted colorant from reactive dyes can be further reacted with a cationic compound to form a colored complex. In this instance, the nucleophile substituted colorant is mixed with a cationic compound and heated to a temperature of at least 20° C. for several hours. The formed complex is then purified to remove undesired inorganic salts and water. The colored complex can be diluted with appropriate organic solvents.

Many polymeric amines, or mixtures of amines, may be used to react with a reactive dye to form the polymeric colorant that may be used to make the inventive synthetic leather. It is desirable that the amines are primary amines. It is also desirable that the amines consist of polyalkylene oxide structural units. Polyoxyalkylene amines contain primary amino groups attached to the terminus of a polyether backbone which can be based on either propylene oxide (PO), ethylene oxide (EO), or mixed EO/PO. Preferably, the polyalkylene oxide is polyethylene oxide, for good water solubility and/or miscibility.

There are many commercially available polymeric amines which can be used for this invention. Suitable examples of XYZ reactants from which the present colorant compositions can be prepared include commercially available polyoxyalkyleneamines from the JEFFAMINE Huntsman Chemical and described in Texaco Chemical Company, New Product Development brochures as the M, D, ED, DU, BuD, T, MNPA, and EDR series. The JEFFAMINE consists of monoamines, diamines and triamines, which are available in a variety of molecular weights, ranging from 230 to 6000. JEFFAMINE compounds are designated by letter and number, the latter representing approximate molecular weight. JEFFAMINES (monoamines), D-Series (amine-terminated polypropylene glycols), ED-Series (polyether diamines based on a predominately polyethylene oxide backbone imparting water solubility), DU-Series (urea condensate of D-Series products to provide a diamine product of increased molecular weight which is amine terminated), BuD-Series (urea condensate of D-Series products to provide a urea terminated product), and T-Series (propylene oxide based triamines prepared by reacting PO with a triol initiator, followed by amination of the terminal hydroxyl groups). Specific monoamines include M-600, M-100, M-2005 and M-2070; specific diamines include EDR-148, D-230, D-400, D-2000, XTJ-502, XTJ-511, and XTJ-512; and, specific triamines include T-403 and T-5000. These amines are further described in U.S. Pat. No. 5,270,363 to Kluger et al., at columns 7 to 12.

Examples of amines having hydroxyl group include diethylene glycol amine, aminopropyl diethylene glycol which is available from Dixie Chemical Company under the trade name DCA 163, bis(hydroxyalkyl)diamines like APDEA and APDIPA from Tomah. Another series of glycol ether primary amines from Tomah include PA-EGM, PA-EGB, PA-EGH, PA-DEGM, PA-DEGB, PA-PGM, PA-PGB, PA-DPGM and PA-DPGB. Another series of di primary amines from Tomah include DPA-DEG, DPA-200E, DPA-400E, DPA-1000E, NDPA-10.

The solubility of the colorant used in the present invention can vary by the relative hydrophilic/oleophilic character of the poly(oxyalkylene) substituent and the end group, as well as the presence or absence of ionic groups on the organic chromophore. Preferably, the present colorant compositions are soluble in polar solvent, e.g., methanol and water.

In one embodiment, it may be preferable that the colorants are substantially salt-free. Substantially salt-free is intended to mean that the colorant contains less than 5% by weight, preferably less than 3% by weight, or most preferably, less than 1% by weight of salt-containing compounds. Thus, the colored coatings and article leathers made therefrom comprise salt-free dyes and/or colorants.

General Reaction Conditions for Preparation of Nucleophile-Substituted Colorant:

One equivalent of reactive dyestuff was mixed with about 5-10% molar excess of nucleophilic compound, one equivalent of sodium carbonate (or other suitable acid scavenger), and enough water or other suitable solvents to afford mixing. The reaction mixture was then heated to 80 degrees Celsius resultant solution then phase separated. The concentrated colorant phase was then brought to a neutral pH and further purified to remove inorganic salts and/or diluted with suitable solvents if desired.

If colored complex is desired, the colorant obtained from above procedure was mixed with a cationic compound or a mixture of cationic compounds, and heated to 60 to 80 degree Celsius for one hour. The formed colored complex was further purified to remove salts and water, and can be diluted with desired organic solvents or blend with other additives and resins.

Other Colorants

In addition to the herein-described colorants, other coloring agents can be incorporated into the synthetic leather article in order to control the color hue. These coloring agents include conventionally known pigments and dyes. Examples of blue pigments include, but are not limited to, phthalocyanine C.I. Pigment Blue 15:3 and indanthrone C.I. Pigment Blue 60; examples of red pigments include, but are not limited to, quinacridone C.I. Pigment Red 122, azo C.I. Pigment Red 22, C.I. Pigment Red 48:1, C.I. Pigment Red 48:3 and C.I. Pigment Red 57:1; examples of yellow pigments include, but are not limited to, azo C.I. Pigment Yellow 12, C.I. Pigment Yellow 13, C.I. Pigment Yellow 14, C.I. Pigment Yellow 17, C.I. Pigment Yellow 97, C.I. Pigment Yellow 155, benzimidazolone C.I. Pigment Yellow 151, C.I. Pigment Yellow 154 and C.I. Pigment Yellow 180; examples of black pigments include, but are not limited to, carbon black. Examples of suitable dyes include, but are not limited to, solvent dyes, such as Yellow 82, Orange 5, Orange 62, Red 8, Red 62, Red 122, Blue 70, Black 27, and Black 34. For ease of handling and mixing in the production of the synthetic leather articles, any pigments used preferably are added in the form of a dispersion or in resin pallet/flake forms, and any dyes used preferably are added in the form of a solution or in resin pallet/flake forms.

Additives

In some instances, it may be desirable to include additives in the resin mixture, in addition to the resin and colorants. These additives include dispersing agents, plasticizers, special pigments, compatibilizers, matting agents, leveling agents, color fixing agents, rheological controlling agents, and the like. Examples of additives may include polyvinylpyrrolidone compounds, polyethyleneimine-containing materials (such as polyethyleneimine methyl benzene sulfonic acid), and mixtures thereof.

Polyvinylpyrrolidone compounds having a molecular weight greater than or equal to 1000 are suitable. Polyvinylpyrrolidone compounds having a molecular weight in the range from about 1000 to about 1,000,000, or in the molecular weight range from about 1000 to about 600,000, or in the molecular weight range from about 1000 to about 300,000, or in the molecular weight range from about 1000 to about 150,000 are suitable. Polyvinylpyrrolidone compounds having a molecular weight in the range from about 2500 to about 1,000,000, or in the molecular weight range from about 2500 to about 600,000, or in the molecular weight range from about 2500 to about 300,000, or in the molecular weight range from about 2500 to about 150,000 are suitable. Further, polyvinylpyrrolidone compounds having a molecular weight in the range from about 40,000 to about 1,000, 000, or in the molecular weight range from about 40,000 to about 600,000, or in the molecular weight range from about 40,000 to about 300,000, or in the molecular weight range from about 40,000 to about 150,000 are suitable.

Polyethyleimine-containing materials having a molecular weight greater than or equal to 1200 are suitable. Polyethyleimine-containing materials having a molecular weight in the range from about 1200 to about 1,000,000, or in the molecular weight range from about 1200 to about 600,000, or in the molecular weight range from about 1200 to about 300,000, or in the molecular weight range from about 1200 to about 150,000 are suitable. Polyethyleimine-containing materials having a molecular weight in the range from about 1800 to about 1,000,000, or in the molecular weight range from about 1800 to about 600,000, or in the molecular weight range from about 1800 to about 300,000, or in the molecular weight range from about 1800 to about 150,000 are suitable. Further, polyethyleneimine-containing materials having a molecular weight in the range from about 12,000 to about 1,000,000, or in the molecular weight range from about 12,000 to about 600,000, or in the molecular weight range from about 12,000 to about 300,000, or in the molecular weight range from about 12,000 to about 150,000 are suitable. Further, polyethyleneimine-containing materials having a molecular weight in the range from about 85,000 to about 1,000,000, or in the molecular weight range from about 85,000 to about 600,000, or in the molecular weight range from about 85,000 to about 300,000, or in the molecular weight range from about 85,000 to about 150,000 are suitable.

Making Synthetic Leathers

The synthetic leather articles of the invention can be produced using any suitable method. For example, the synthetic leather articles can be produced using both "a direct coating process" and "a transfer coating process", or "dry" and "wet" methods. In two-component technologies, polymeric colorants preferably are mixed with polyols to react with isocyanates to form a high viscosity isocyanate- or hydroxyl-terminated prepolymer. This prepolymer can then be directly coated onto a substrate or onto transfer substrate (e.g., release paper) using a doctor blade and cured by respective curing methods. If a free resin film is produced, the film then needs to be laminated to a textile substrate in a subsequent step. In one-component technologies using commercially available polyurethane or polyurea resins, the resin can be used in the form of a solvent solution ("solvent method"), or the resin can be in the form of an aqueous dispersion ("aqueous method"). In the solvent method, the polymeric colorant(s) preferably are thoroughly mixed with a polyurethane solution in polar solvents, such as dimethylformamide (DMF) and/or methyl ethyl ketone (MEK). The high viscosity solution is then spread onto a carrier or release paper, and the material is oven dried and laminated onto a substrate to form a synthetic leather article. In the aqueous method, the polymeric colorant(s) preferably are thoroughly mixed with an aqueous polyurethane dispersion (PUD) to form an aqueous emulsion. A suitable substrate is then impregnated with the emulsion, and the coated substrate is dried and cured to produce a synthetic leather article.

In a first method embodiment, the invention provides a method for producing a synthetic leather article comprising the steps of (a) providing a resin or prepolymer, (b) providing a colorant, preferably a polymeric colorant, (c) mixing the colorant and the resin or prepolymer to form a mixture, (d) applying the mixture obtained in step (c) onto a transfer substrate and heating the substrate to dry the substrate and form a resin coating thereon, (e) applying an adhesive onto the resin coating produced in step (d), (f) applying a backing substrate to the adhesive layer produced in step (e), (g) heating the assembly produced in step (f) to dry the assembly and bond the fibrous backing substrate to the adhesive layer, and (h) removing the transfer substrate from the assembly produced in (g) to produce a synthetic leather article.

The substrate, resin or prepolymer, and colorant used in the first method embodiment can be any suitable substrate, resin or prepolymer, and colorant, including those described above with respect to the synthetic leather articles according to the invention. The transfer substrate used in the first method embodiment can be any substrate that permits the formation of a resin coating thereon, while still enabling that resin coating to be released from the substrate without damaging the coating. Suitable transfer substrates include, but are not limited to, a release paper, such as a silicone-treated, mirror-surface release paper.

In accordance with the first method embodiment, a synthetic leather article can be produced, for example, by thoroughly mixing a polyurethane resin solution in methyl ethyl ketone/dimethylformamide with at least one polymeric colorant and, optionally, with other additives. The mixture is then directly coated onto a release paper. After evaporating the solvent by oven drying or other drying process to produce a resin coating on the release paper, a thin layer of adhesive is applied onto the resin coating. A suitable substrate is then applied to the adhesive layer, and the resulting assembly is heated. The release paper is then peeled off of the assembly to reveal a synthetic leather article. Furthermore, due to the lack of or minimal color migration resulting from the use of the polymeric colorants, the release paper typically is not discolored by the colorants employed and, therefore, can be reused.

In a second method embodiment, the invention provides a method for producing a synthetic leather article comprising the steps of (a) providing a resin or prepolymer, (b) providing a colorant, preferably a polymeric colorant, (c) mixing the colorant and the resin or prepolymer to form a mixture, (d) applying the mixture obtained in step (c) onto a backing substrate, (e) immersing the coated substrate obtained in step (d) in an aqueous solution to cure the resin or prepolymer and form a coating on the surface thereof, (f) removing the substrate from the aqueous solution, and (g) heating the substrate to dry the substrate and produce a synthetic leather article.

The substrate, resin or prepolymer, and colorant used in the second method embodiment can be any combination of suitable substrate, resin or prepolymer, and polymeric colorant, including those described herein with respect to the synthetic leather articles according to the invention.

In accordance with the second method embodiment, a synthetic leather article can be produced, for example, by thoroughly mixing a polyurethane resin or prepolymer solution in dimethylformamide with at least one colorant and, optionally, with other additives. The mixture is then coated onto a suitable substrate, and the coated substrate is then immersed in an aqueous medium. While immersed in the aqueous medium, the solvent (e.g., dimethylformamide) is extracted from the mixture, which causes the polymer in the mixture to coagulate and form a film. The resulting substrate is then dried to produce a synthetic leather article.

EXAMPLES

The following examples are given for illustration and should not be considered as limiting the scope of the invention.

Example 1

Synthesis of Polymeric Colorant Red 1

14.7 gram of Reactive Red 120, 12 gram of Jeffamine M-1000 and 30 gram of DMF were charged into a reactor equipped with agitator, temperature control and condenser. The mixture was heated to 50° C. for 3 hours and TLC was used to monitor the reaction progress. After the starting material, Reactive Red 120, was consumed completely, the reaction mixture was filtered to remove solid residues to obtain dark red, uniform product solution with the maximum absorption at 542 nm.

Example 2

Synthesis of Polymeric Colorant Blue 1

13.1 gram of Reactive Blue 160, 22 gram of Jeffamine M-1000 and 30 gram of DMF were charged into a reactor equipped with agitator, temperature control and condenser. The mixture was heated to 50° C. for 3 hours and TLC was used to monitor the reaction progress. After the starting material, Reactive Blue 160, was consumed completely, the reaction mixture was filtered to remove solid residues to obtain dark blue, uniform product solution.

Example 3

Synthesis of Polymeric Colorant Yellow 1

16.3 gram of Reactive Yellow 81, 22 gram of Jeffamine M-1000 and 30 gram of DMF were charged into a reactor equipped with agitator, temperature control and condenser. The mixture was heated to 50° C. for 3 hours and TLC was used to monitor the reaction progress. After the starting material, Reactive Yellow 81, was consumed completely, the reaction mixture was filtered to remove solid residues to obtain yellow, uniform product solution.

Example 4

Synthesis of Polymeric Colorant Red 2

14.7 gram of Reactive Red 120, 36 gram of polyether amine and 30 gram of water were charged into a reactor equipped with agitator, temperature control and condenser. The mixture was heated to 60° C. for 3 hours and TLC was used to monitor the reaction progress. After the starting material, Reactive Red 120, was consumed completely, the reaction mixture was washed by salt saturated aqueous solution 1-3 times, precipitated and dried, then added 9.5 gram of polyvinylpyrrolidone, 5.5 gram of (polyethyleneimine methyl benzene sulfonic acid) neutralization and 25 gram of DMF. The reaction mixture was filtered and centrifuged to remove solid residues to obtain dark red, uniform product solution.

Example 5

Synthesis of Polymeric Colorant Red 3

11.4 gram of Reactive Red 195, 24 gram of polyether amine and 30 gram of water were charged into a reactor equipped with agitator, temperature control and condenser. The mixture was heated to 65° C. for 3 hours and TLC was used to monitor the reaction progress. After the starting material, Reactive Red 195, was consumed completely, the reaction mixture was washed by salt saturated aqueous solution 1-3 times, precipitated and dried, then added 9.5 gram of polyvinylpyrrolidone, 5.5 gram of (polyethyleneimine methyl benzene sulfonic acid) neutralization and 25 gram of DMF. The reaction mixture was filtered and centrifuged to remove solid residues to obtain dark red, uniform product solution.

Example 6

Synthesis of Polymeric Colorant Red 4

7.5 gram of Reactive Red 2, 36 gram of polyether amine and 30 gram of water were charged into a reactor equipped with agitator, temperature control and condenser. The mixture was heated to 55° C. for 3 hours and TLC was used to monitor the reaction progress. After the starting material, Reactive Red 2, was consumed completely, the reaction mixture was washed by salt saturated aqueous solution 1-3 times, precipitated and dried, then added 9.5 gram of polyvinylpyrrolidone, 5.5 gram of (polyethyleneimine methyl benzene sulfonic acid) neutralization and 25 gram of DMF. The reaction mixture was filtered and centrifuged to remove solid residues to obtain dark red, uniform product solution.

Example 7

Synthesis of Polymeric Colorant Red 5

17.7 gram of Reactive Red 141, 12 gram of polyether amine and 30 gram of water were charged into a reactor equipped with agitator, temperature control and condenser. The mixture was heated to 55° C. for 3 hours and TLC was used to monitor the reaction progress. After the starting material, Reactive Red 141, was consumed completely, the reaction mixture was washed by salt saturated aqueous solution 1-3 times, precipitated and dried, then added 9.5 gram of polyvinylpyrrolidone, 5.5 gram of (polyethyleneimine methyl benzene sulfonic acid) neutralization and 25 gram of DMF. The reaction mixture was filtered and centrifuged to remove solid residues to obtain dark red, uniform product solution.

Example 8

Synthesis of Polymeric Colorant Red 6

14.7 gram of Reactive Red 120 (50% dye content), 11 gram of Jeffamine M-1000, 0.84 gram of sodium bicarbonate and 50 mL of water were charged into a reactor equipped with agitator, temperature control and condenser. The mixture was heated to 80° C. for several hours until the starting material Reactive Red 120 was gone as monitored by TLC. Then 12.1 gram of Aliquat® 336 was added slowly and stirred at 80° C. for one hour. The reaction mixture was cooled to room temperature and 150 mL of chloroform was added. The chloroform layer was washed with water to remove salts. 20.6 gram of dark red paste with color value of 9.6 was obtained after removing chloroform.

Example 9

Synthesis of Polymeric Colorant Red 7

7.35 gram of Reactive Red 120 (50% dye content), 5.0 gram of Jeffamine M-1000, 0.42 gram of sodium bicarbonate and 50 mL of water were charged into a reactor equipped with agitator, temperature control and condenser. The mixture was heated to 80° C. for several hours until the starting material Reactive Red 120 was gone as monitored by TLC. Then 5.85 gram of benzyltriphenylphosphonium chloride was added slowly and stirred at 80° C. for one hour. The reaction mixture was cooled to room temperature and 150 mL of chloroform was added. The chloroform layer was washed with water to remove salts. 15.4 gram of dark red paste with color value of 8.3 at the absorption maximum at 543 nm was obtained after removing chloroform.

Example 10

Synthesis of Colorant Red 8

14.7 gram of Reactive Red 120 (50% dye content), 2.81 gram of 3-(2-ethylhexyloxy)-propyl amine, 0.84 gram of sodium bicarbonate and 30 mL of water were charged into a reactor equipped with agitator, temperature control and condenser. The mixture was heated to 80° C. for several hours until the starting material Reactive Red 120 was gone as monitored by TLC. Then 12.1 gram of Aliquat® 336 was added slowly and stirred at 80° C. for one hour. The reaction mixture was cooled to room temperature and dark red solid was precipitated. The solid was filtered and washed with water to remove salts. 24.1 gram of red solid with color value of 12.8 was obtained.

Example A

Production of Red Synthetic Leather

This example demonstrates the production of synthetic leather articles in accordance with the invention. 5 parts polymeric colorant red 1 from Example 1 was mixed well with 100 part of polyurethane resin SU-9704 from Stahl. This red polyurethane resin solution was directly applied onto a commercially available silicone-treated, mirror-surface release paper to form a film coating having a thickness of approximately 15 microns. A commercially available base substrate having a thickness of 1 mm (a non-woven fibrous sheet having a thickness of 80 microns and a polyurethane elastomer impregnated/coated and solidified on one side) was then pressed/bonded onto this film coating. Then, the assembly was heated to a temperature of approximately 120° C. in an oven and kept at that temperature for 3 minutes. The assembly was then removed from the oven and cooled down to room temperature, and the release paper was then peeled off of the assembly. A synthetic leather article having a red skin layer was thus obtained. Furthermore, no visible red color was detected on the release paper, which suggests that none of the red colorant had migrated onto the release paper.

The synthetic leather article was tested for leather to leather migration. The synthetic leather article was pressed with clean white PVC or PU synthetic leather in 70° C. oven for 24 hours. Then the white PVC or PVC synthetic leather samples were measured for colors transferred from the inventive synthetic leather. No visible red color was detected on the PVC or PU synthetic test leather surface.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A coating comprising at least one resin and at least one reactive dye derivative, wherein the reactive dye derivative is the reaction product of:
   (a) at least one reactive dye wherein the reactive dye is represented by A-B$_n$, wherein A is an organic chromophore, B is an electrophilic reactive group covalently bonded to A directly or through a linking group and n is an integer from 1 to 10 and represents the number of reactive groups, B, on one organic chromophore, A, and
   (b) at least one nucleophilic group of general structure (I):

X—Y—Z          (I)

wherein X is a nucleophilic reactive linking group; Y is an aliphatic or aromatic or polymeric organic substituent; and Z is an end group;
   wherein X is selected from the group consisting of NR, O, S, and 4-oxyanilino (—HN-Ph-O—); wherein R is selected from the group consisting of H, alkyl, and YZ; and wherein Y is a monomeric or polymeric aliphatic or aromatic group or combinations thereof;
   wherein the at least one resin is selected from the group consisting of polyurethane resin, polyurea resin, and combinations thereof; and
   wherein the reactive dye derivative is further complexed with a cationic compound selected from the group consisting of amino, ammonium, imino, sulfonium, and phosphonium groups.

2. The coating of claim 1, wherein the at least one resin is a polyurethane resin.

3. The coating of claim 1, wherein the at least one nucleophilic group is selected from the group consisting of hydroxyl, amine, and thiol.

4. The coating of claim 3, wherein the at least one nucleophilic group is amine.

5. The coating of claim 1, wherein the cationic compound is a quaternary ammonium or phosphonium compound.

6. The coating of claim 1, wherein the coating is transparent.

\* \* \* \* \*